United States Patent
Lin et al.

(10) Patent No.: US 11,114,874 B2
(45) Date of Patent: Sep. 7, 2021

(54) BATTERY-AND-HANDHELD-SEAT ASSEMBLING STRUCTURE AND A BATTERY-AND-CHARGER ASSEMBLING STRUCTURE FOR A HANDHELD POWER TOOL

(71) Applicant: Yu-Tang Lin, New Taipei (TW)

(72) Inventors: Yu-Tang Lin, New Taipei (TW); Hsien-Yu Kao, New Taipei (TW)

(73) Assignee: Yu-Tang Lin, New Taipei (TW)

( * ) Notice: Subject to any disclaimer, the term of this patent is extended or adjusted under 35 U.S.C. 154(b) by 188 days.

(21) Appl. No.: 16/408,278

(22) Filed: May 9, 2019

(65) Prior Publication Data

US 2020/0235594 A1   Jul. 23, 2020

(30) Foreign Application Priority Data

Jan. 22, 2019 (TW) ................. 108201034
Feb. 27, 2019 (TW) ................. 108202530

(51) Int. Cl.
| | |
|---|---|
| *H02J 7/00* | (2006.01) |
| *B25B 21/00* | (2006.01) |
| *H01M 50/20* | (2021.01) |

(52) U.S. Cl.
CPC ............ *H02J 7/0045* (2013.01); *B25B 21/00* (2013.01); *H01M 50/20* (2021.01); *H02J 7/0042* (2013.01); *H01M 2220/30* (2013.01); *H02J 7/0044* (2013.01)

(58) Field of Classification Search
CPC ...... H02J 7/0045; H02J 7/0063; H02J 7/0042; H01M 50/20; H01M 2220/30; H01M 50/256; B25B 21/00; Y02E 60/10; B25F 5/02

USPC .................................... 320/112, 114
See application file for complete search history.

(56) References Cited

U.S. PATENT DOCUMENTS

| | | | | |
|---|---|---|---|---|
| 2008/0124615 A1* | 5/2008 | Matsumoto | ........... | H01M 50/20 429/61 |
| 2011/0005793 A1* | 1/2011 | Hanawa | ................ | H01M 50/20 173/217 |
| 2011/0267747 A1* | 11/2011 | Yoshimura | ............ | H01M 50/20 361/679.01 |
| 2013/0089764 A1* | 4/2013 | Melnyk | ................. | H01M 50/20 429/72 |
| 2013/0136956 A1* | 5/2013 | Nakano | ............... | H01M 50/213 429/7 |

(Continued)

*Primary Examiner* — Zixuan Zhou
(74) *Attorney, Agent, or Firm* — Sinorica, LLC (57) ABSTRACT

A battery-and-handheld-seat assembling structure includes a handheld seat and a battery. A battery-and-charger assembling structure includes a battery and a charger. The battery is detachably mounted on the handheld seat or in the charger. The battery has two first grooves formed on two side surfaces. Each first groove has a transverse segment and a longitudinal segment connected to each other vertically or substantially vertically. The handheld seat has two first assembling segments. The charger has two third assembling segments. The first assembling segments or the third assembling segments are selectively mounted in the two transverse segments respectively. Each of the first assembling segments or each of the third assembling segments engages with or disengages from the corresponding first groove, thereby strengthening the connection between the battery with the handheld seat or the charger.

2 Claims, 11 Drawing Sheets

(56) References Cited

U.S. PATENT DOCUMENTS

| | | | | |
|---|---|---|---|---|
| 2014/0248519 A1* | 9/2014 | Nishikawa | ............ | H01M 50/24 |
| | | | | 429/99 |
| 2014/0272516 A1* | 9/2014 | Tennison | .......... | H01M 10/6555 |
| | | | | 429/120 |
| 2014/0302353 A1* | 10/2014 | Ogura | ................. | H01M 50/213 |
| | | | | 429/7 |
| 2015/0140384 A1* | 5/2015 | Chellew | ................ | H01M 50/20 |
| | | | | 429/96 |
| 2015/0249237 A1* | 9/2015 | Naito | .................... | H01M 50/20 |
| | | | | 429/7 |

* cited by examiner

BATTERY-AND-HANDHELD-SEAT ASSEMBLING STRUCTURE AND A BATTERY-AND-CHARGER ASSEMBLING STRUCTURE FOR A HANDHELD POWER TOOL

CROSS-REFERENCE TO RELATED APPLICATIONS

This application is based upon and claims priority under 35 U.S.C. 119 from Taiwan Patent Application No. 108201034 filed on Jan. 22, 2019 and Taiwan Patent Application No. 108202530 filed on Feb. 27, 2019, which are hereby specifically incorporated herein by this reference thereto.

BACKGROUND OF THE INVENTION

1. Field of the Invention

The present invention relates to a tool, especially to a handheld power tool.

2. Description of the Prior Arts

A handheld power tool makes assembling or disassembling of objects easier and more effective. The handheld power tool uses a battery as a power source and is combined with a traditional hand tool such as a screwdriver or a drill so that people can use a handheld power tool instead of manually driving the hand tools.

The abovementioned handheld power tool has a driving assembly, a handheld seat, and a battery. The battery is detachably mounted on a bottom end of the handheld seat as a power source to drive the driving assembly which is mounted on a top end of the handheld seat. Thus, by mounting a hand tool such as a screwdriver or a drill on the driving assembly, a user is able to drive the tool by electricity instead of driving the tool manually. In addition, for purposes of environmental protection, the battery can be detached from the handheld seat and be connected to a charger to be recharged when out of power. Specifically, a conventional charger has a shallow groove and multiple conductive pins. The battery is placed in the shallow groove and is connected to the conductive pins to be recharged.

However, the conventional battery has the following disadvantages.

First, an assembling structure between the battery and the handheld seat makes them hard to be assembled, and a user may drop the battery during assembling due to the bad design of the assembling structure. Specifically, two side surfaces of the battery form two grooves respectively. Each groove extends horizontally from a front end of the battery to a rear end of the battery, and forms an opening on the rear end of the battery. A bottom groove is formed on a bottom end of the handheld seat. Two inner side surfaces of the bottom groove form two ribs respectively. When assembling, the user must hold the handheld seat and the battery by two hands respectively, and align two front ends of the ribs to the openings of the grooves. Then, the user slides the ribs into the grooves and moves the ribs to a front end of the grooves to make the handheld seat and battery assembled firmly. However, in order to align the two front ends of the ribs to the openings of the grooves, the user has to align a corner of the handheld seat to a corner of the battery when moving them toward each other. Therefore, the assembling process is not easy to operate and the battery may be dropped easily due to an inappropriate direction of a force applied by the user.

In addition, the handheld seat and the battery are mounted together by only two grooves and two ribs on two sides respectively. Therefore, when an impact occurs, the impact is borne by only one groove and one rib on each side such that the groove and the rib will be damaged easily. If any rib or any groove is damaged due to the impact or the inappropriate direction of the force applied by the user during assembling, the handheld seat and the battery will never be assembled again.

Besides, the grooves, which extend from the front end of the battery to the rear end of the battery, leads to high time-consumption because it takes time for the user to move the ribs from the rear ends of the grooves to the front ends of the grooves. This is against the main purpose of a tool, which is to increase efficiency.

Second, when being recharged, the battery is placed on the shallow groove without fixing such that the battery will be easily separated from the conductive pins or the battery may fall from the charger after an impact. Both situations lead to failure of recharging and damage to the battery, and even short circuit and fire.

In summary, the assembling structures between the battery and the handheld seat and between the battery and the charger need to be improved.

To overcome the shortcomings, the present invention provides an assembling structure for a battery of a handheld power tool to mitigate or obviate the aforementioned problems.

SUMMARY OF THE INVENTION

The main objective of the present invention is to provide an assembling structure for a battery of a handheld power tool that makes the handheld seat and the battery assembled easily and strengthens the structure after assembly to overcome the impact. Besides, the assembling structure makes the battery and the charger assembled stably as well so that the assembling structure prevents the battery and the charger from being separated easily, and further avoid damaging the battery and causing fire.

The assembling structure for a battery of a handheld power tool has a handheld seat and a battery. The handheld seat has two assembling walls and two first assembling segments. The two assembling walls protrude downwardly from a bottom surface of the handheld seat, and is spaced apart from each other. The two first assembling segments are formed respectively on the two assembling walls toward each other. The battery is mounted detachably on the handheld seat and has a casing. The casing has a connecting surface and two first grooves. The connecting surface is connected to the bottom surface of the handheld seat. The two first grooves are formed on two side surfaces of the casing respectively. Each of the first grooves has a transverse segment and a longitudinal segment. The transverse segment extends toward a front end of the casing and a rear end of the casing, and a front end of the transverse segment is closed. The longitudinal segment extends toward a top end of the casing and a bottom end of the casing. The longitudinal segment is connected to and communicates with a rear end of the transverse segment, extends to the connecting surface of the casing, and forms a first opening on the connecting surface of the casing. The two first assembling segments of the handheld seat are selectively mounted in the two transverse segments of the two first grooves of the casing respectively. Each of the first assembling segments enters or departs from the corresponding first groove through the corresponding first opening.

The present invention forms two first grooves on the casing of the battery. Each first groove has a transverse segment and a longitudinal segment. The longitudinal segment forms a first opening on the connecting surface of the casing. By this, when a user is assembling the handheld seat and the battery, the user aligns the connecting surface of the battery to a bottom surface of the handheld seat first and moves the battery and the handheld seat toward each other. Then, the user moves the two first assembling segments into the two first grooves through the two first opening respectively. Therefore, the present invention is assembled by aligning two surfaces instead of aligning two corners so that the present invention prevents the battery from being dropped due to the inappropriate direction of the force applied by the user during assembling. Thus, the assembling process of the present invention is easier to operate.

Besides, when the battery is mounted on the charger and being recharged, the two third assembling segments of the charger are moved into the two longitudinal segments of the two first grooves through the two first openings respectively, and then are moved into the two transverse segments. Therefore, when being recharged, the battery is placed in the battery groove of the charger as well as the two first assembling segments on the two side walls of the battery groove are mounted together with the two first grooves, which are in L shape, on the two sides of the battery. Moreover, the first assembling segment and the first groove are not only engaged to each other but also prevent the battery and the charger from sliding relative to each other because the first assembling segment and the first groove generate friction between themselves. Therefore, the first assembling segment and the first groove make the battery and the charger assembled stably, prevent the battery and the charger from being separated easily by an impact, and further avoid damaging the battery and causing fire.

In addition, the transverse segment and the longitudinal segment make it unnecessary for the first groove to extend from the front end of the battery to the rear end of the battery. Therefore, the first groove shortens the distance that the battery is moved and reduces the time for assembling the battery and the handheld seat or the battery and the charger. Furthermore, the transverse segment and the longitudinal segment avoid forming the first opening of the first groove on an end of the battery so that the transverse segment and the longitudinal segment further prevent the battery from being dropped due to the inappropriate direction of the force applied by the user during assembling.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
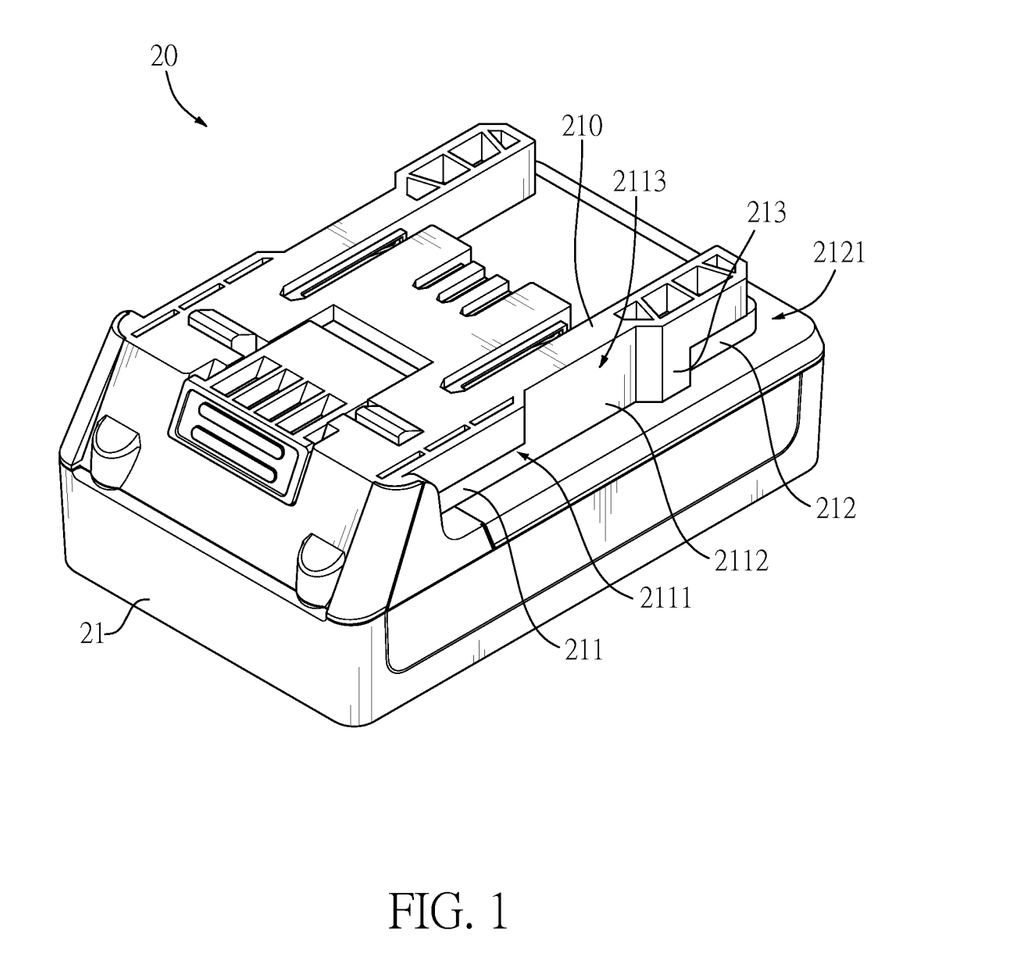
FIG. 1 is a perspective view of a battery-and-handheld-seat assembling structure for a handheld power tool in accordance with the present invention; showing the battery.
Figure 2:
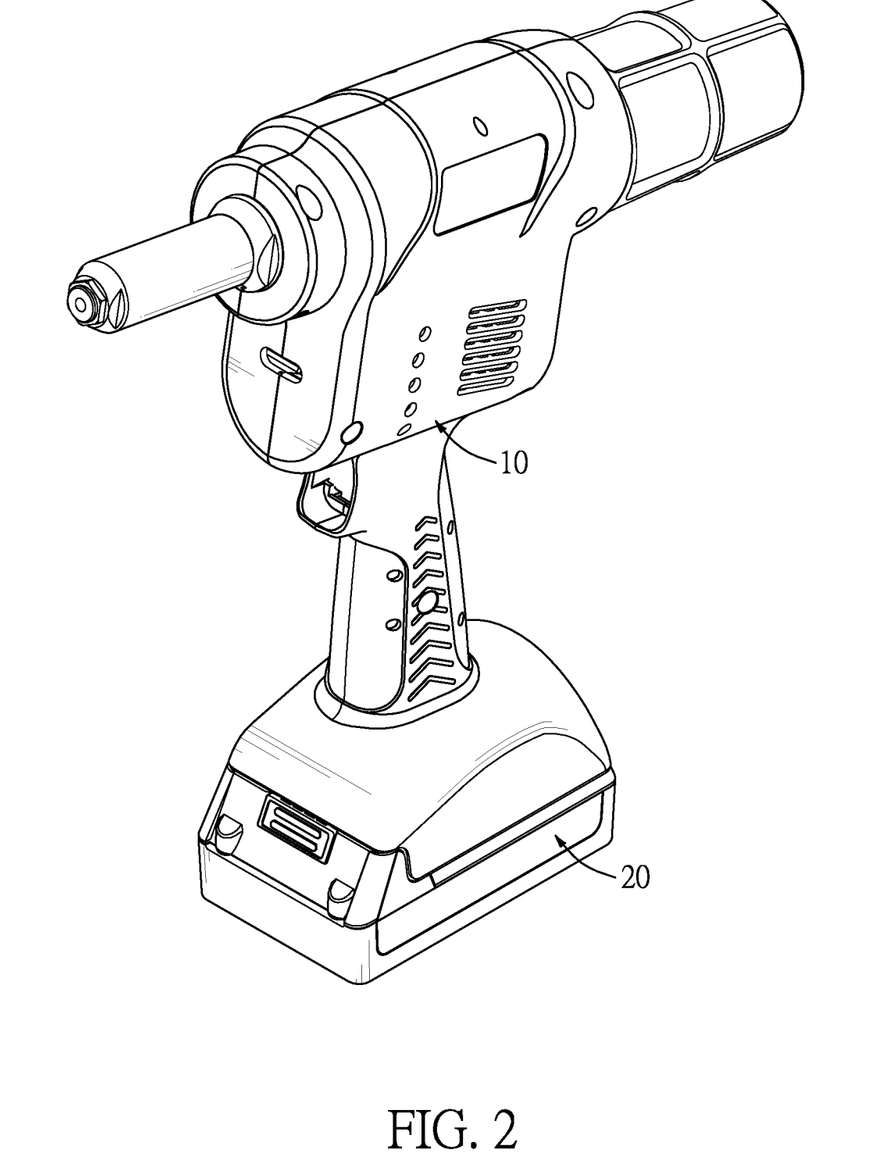
FIG. 2 is a perspective view of the battery-and-handheld-seat assembling structure in FIG. 1; showing the battery mounted on the handheld seat.
Figure 7:
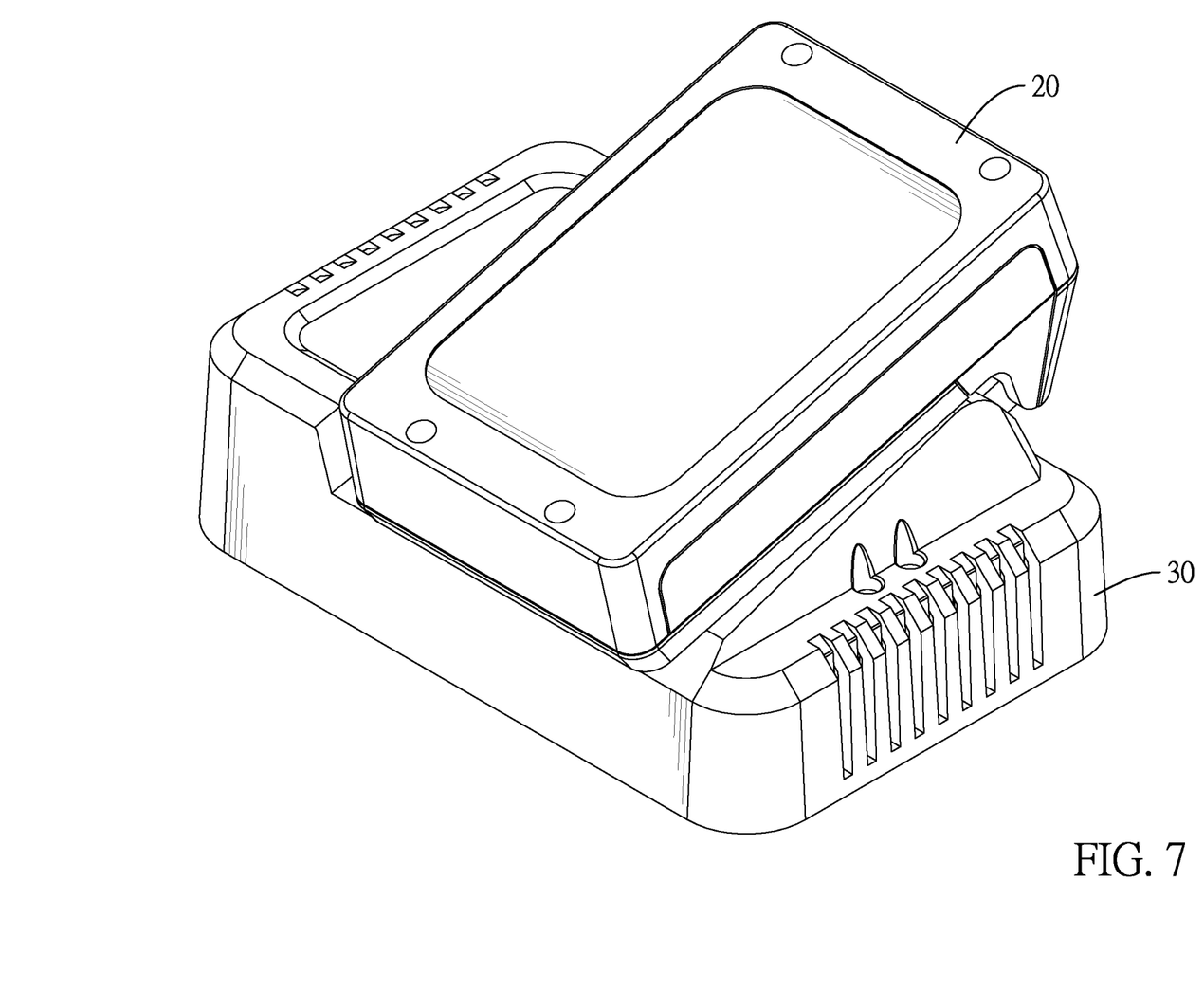
FIG. 7 is a perspective view of a battery-and-charger assembling structure for a handheld power tool in accordance with the present invention; showing the battery mounted on the charger.

With reference to FIGS. 1, 2, and 7, a battery-and-handheld-seat assembling structure for a handheld power tool in accordance with the present invention comprises a handheld seat 10 and a battery 20. A battery-and-charger assembling structure for a handheld power tool in accordance with the present invention comprises a battery 20 and a charger 30. The basic structures of the battery 20 in the two aforementioned assembling structures are the same, and so are their preferred embodiments, which will be described together as follows.

The battery 20 has a casing 21. The casing 21 has a connecting surface 210, two first grooves 211, two second grooves 212, and two stopping walls 213.

The two first grooves 211 are formed on two side surfaces of the casing 21 respectively. Each of the first grooves 211 has a transverse segment 2111 and a longitudinal segment 2112. The transverse segment 2111 extends toward a front end of the casing 21 and a rear end of the casing 21. A front end of the transverse segment 2111 is closed and a rear end of the transverse segment 2111 is connected to and communicates with the longitudinal segment 2112. The longitudinal segment 2112 extends toward a top end of the casing 21 and a bottom end of the casing 21, extends to the connecting surface 210 of the casing 21, and forms a first opening 2113 on the connecting surface 210 of the casing 21. In other words, the first groove 211 is a groove in an L shape formed on the casing 21.

The two second grooves 212 are formed on the two side surfaces of the casing 21, are located in the back of the two first grooves 211, and are spaced apart from the two first grooves 211 respectively. Each of the second grooves 212 extends to a rear surface of the casing 21, and forms a second opening 2121 on the rear surface of the casing 21.

The two stopping walls 213 are respectively formed on the two side surfaces of the casing 21. Each of the two stopping walls 213 is disposed between a corresponding one of the first grooves 211 and a corresponding one of the second grooves 212, separates the corresponding first groove 211 and the corresponding second groove 212, and is located in the rear end of the transverse segment 2111. The longitudinal segments 2112 of the two first grooves 211 respectively extends along the two stopping walls 213.

Figure 3:
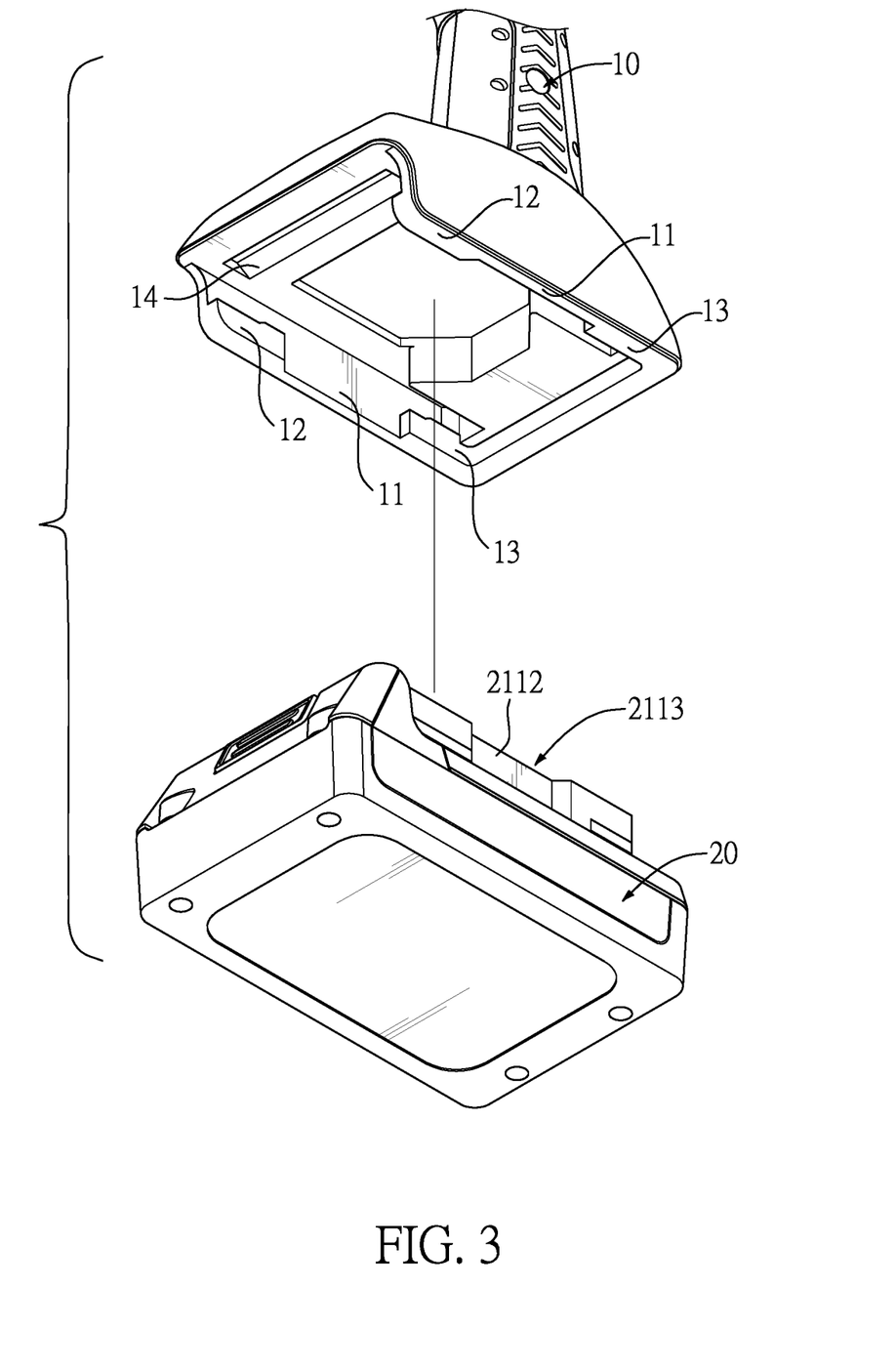
FIG. 3 is an exploded view of the battery-and-handheld-seat assembling structure in FIG. 1; showing the battery and the handheld seat.

With further reference to FIGS. 1, 2, and 3, when in use, the battery 20 is mounted on the handheld seat 10. The handheld seat 10 has two assembling walls 11, two first assembling segments 12, and two second assembling segments 13.

The two assembling walls 11 protrude downwardly from a bottom surface of the handheld seat 10. The two assembling walls 11 are, but not limited to, parallel to each other. The two assembling walls 11 are spaced apart from each other. The two first assembling segments 12 are respectively formed on the two assembling walls 11 toward each other. The two second assembling segments 13 are respectively formed on the two assembling walls 11 toward each other, are located in the back of the two first assembling segments 12, and are spaced apart from the two first assembling segments 12.

Figure 4:
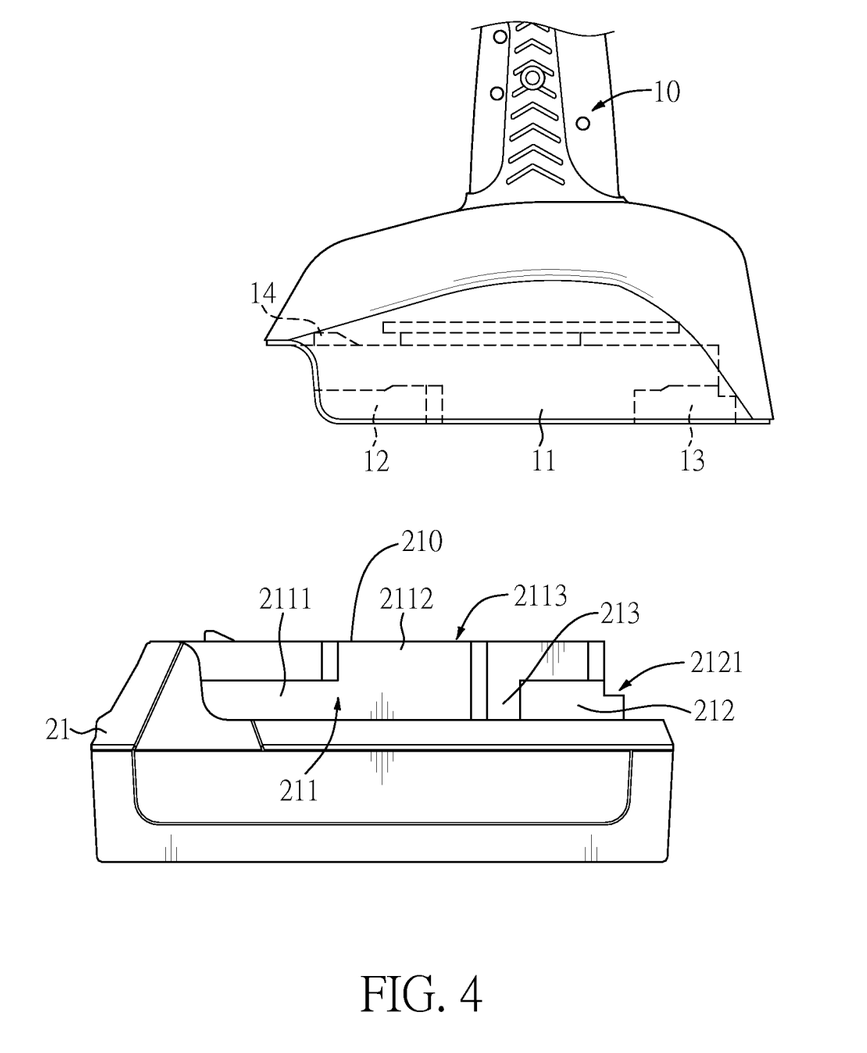
FIGS. 4, 5, and 6 are schematic views of the battery-and-handheld-seat assembling structure in FIG. 1; showing the motion during assembling of the battery and the handheld seat.

With further reference to FIGS. 1, 3, and 4, the battery 20 is mounted on the handheld seat 10 detachably, and the connecting surface 210 of the battery 20 is connected to the bottom surface of the handheld seat 10 when the battery 20 is mounted on the handheld seat 10.

The two first assembling segments 12 of the handheld seat 10 are selectively mounted in the two transverse segments 2111 of the two first grooves 211 of the casing 21 respectively. Each of the first assembling segments 12 enters or departs from the corresponding first groove 211 through the corresponding first opening 2213. The two second assembling segments 13 of the handheld seat 10 are selectively mounted in the two second grooves 212 of the casing 21 respectively. Each of the second assembling segments 13 enters or departs from the corresponding second groove 212 through the corresponding second opening 2121.

Figure 5:
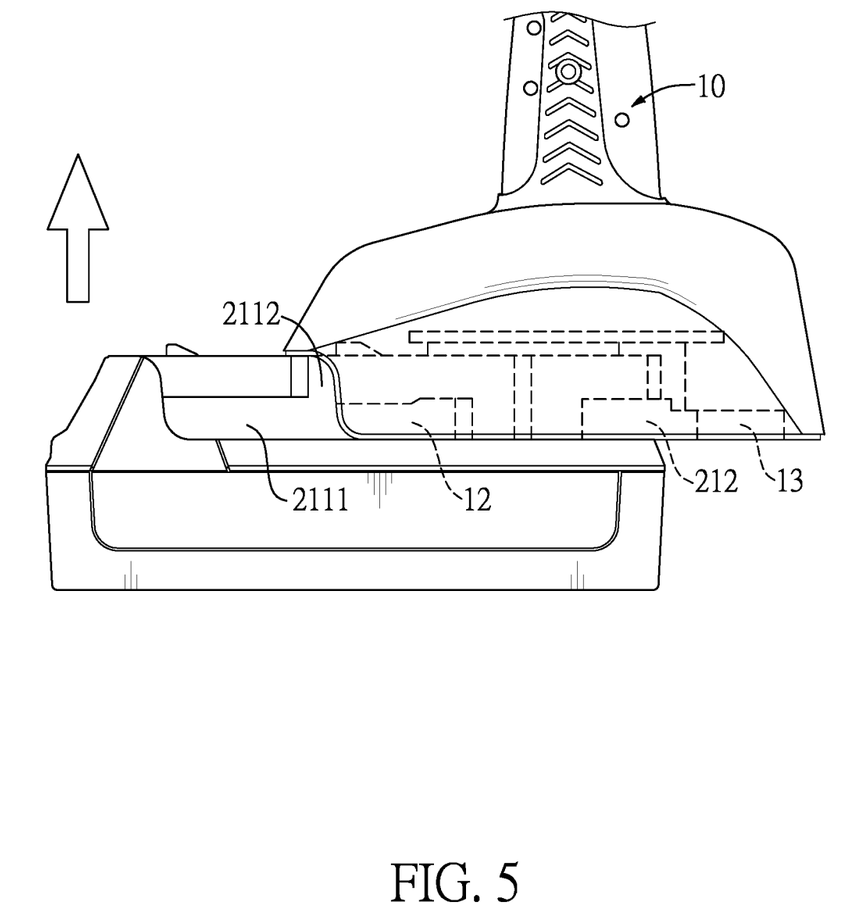
Figure 6:
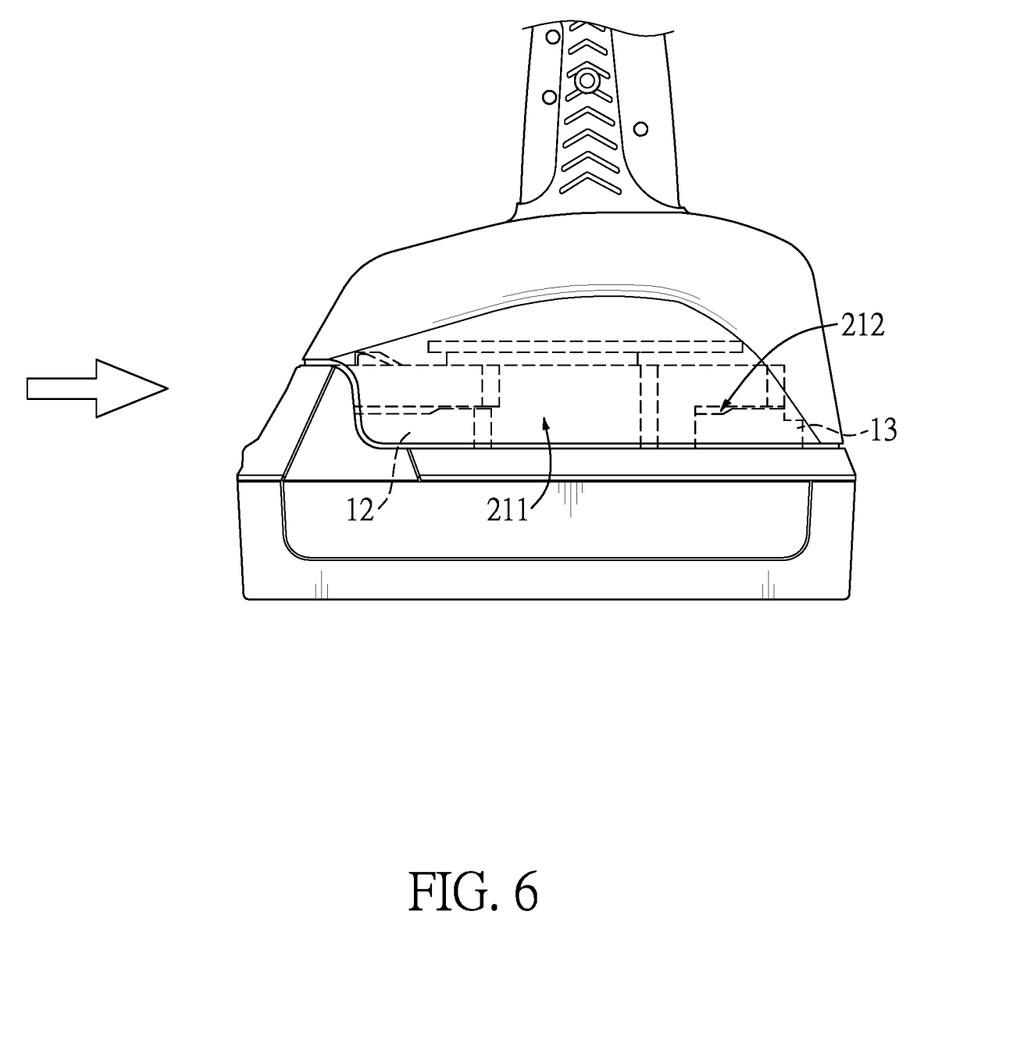

In other words, during assembling, the first assembling segment 12 is moved through the first opening 2113 first, and is then moved along the first groove 211, which is in an L shape. When the first assembling segment 12 is moved to a bottom end of the longitudinal segment 2112, the second assembling segment 13 of the handheld seat 10 is exactly located in a rear side of the second opening 2121, which is formed on the rear surface of the casing 21 by the second groove 212. At the time that the first assembling segment 12 is moved toward the front end of the transverse segment 2111 along the transverse segment 2111, the second assembling segment 13 is moved into the second groove 212 through the second opening 2121. Finally, the first assembling segment 12 is moved to the front end of the transverse segment 2111 as the second assembling segment 13 is moved to a front end of the second groove 212, and the assembling process of the handheld seat 10 and the battery 20 is completed.

Briefly, when each of the first assembling segments 12 of the handheld seat 10 engages with the corresponding first groove 211 through the corresponding first opening 2113, each of the second assembling segments 13 is aligned to the second opening 2121 of the corresponding second groove 212; when each of the first assembling segments 12 is moved into the transverse segment 2111 of the first groove 211, each of the second assembling segments 13 is moved into the second groove 212.

In addition, the second assembling segment 13 and the second groove 212 are made to strengthen the structure of the handheld seat 10 and the battery 20 after assembled. Specifically, the two second assembling segments 13 and the two second grooves 212 share a force of an impact with the two first assembling segments 12 and the two first grooves 211 on the two sides of the casing 21 respectively in order to prevent the first assembling segment 12 and the first groove 211 from bearing the force of the impact alone, and therefore strengthen the product. However, the handheld seat 10 and the battery 20 can also be implemented without the second assembling segment 13 and the second groove 212.

Moreover, in this embodiment, the transverse segment 2111 of each of the first grooves 211 of the casing 21 is located adjacent to the connecting surface 210 of the casing 21, and the longitudinal segment 2112 of each of the first grooves 211 of the casing 21 is located adjacent to a middle between a front end of the casing 21 and a rear end of the casing 21. By this, the present invention significantly shortens the distance for the first assembling segment 12 to move. Thus, the present invention improves efficiency as well. However, the transverse segment 2111 is not limited to be located adjacent to the connecting surface 210 as well as the longitudinal segment 2112 is not limited to be located adjacent to the middle between the front end of the casing 21 and the rear end of the casing 21.

When assembling the battery 20 and the handheld seat 10, the user makes the connecting surface 210 of the battery 20 face to the bottom surface of the handheld seat 10, and moves the battery 20 toward the handheld seat 10. After the first assembling segment 12 of the handheld seat 10 is moved to the rear end of the transverse segment 2111 of the first groove 211 through the first opening 2113 along the longitudinal segment 2112, the user moves the battery 20 and the handheld seat 10 relative to each other along the transverse segment 2111 and then completes the assembling process.

The user abuts a surface against another surface instead of abutting a corner against another corner, thereby eliminating the possibility of causing an inappropriate direction of force. Therefore, the abovementioned assembling process prevents the battery from falling from the user's hand and is more convenient to operate.

In addition, the transverse segment 2111 and the longitudinal segment 2112 make it unnecessary for the first groove 211 to extend from the front end of the battery 20 to the rear end of the battery 20. Therefore, the first groove 211 shortens the distance that the battery 20 is moved and reduces the time for assembling the battery 20 and the handheld seat 10. Furthermore, the second assembling segment 13 and the second groove 212 strengthen the structure of the handheld seat 10 and the battery 20 after assembled by sharing the force of the impact with the two first assembling segments 12 and the two first grooves 211 on the two sides of the casing 21 respectively, and therefore strengthen the product.

Figure 8:
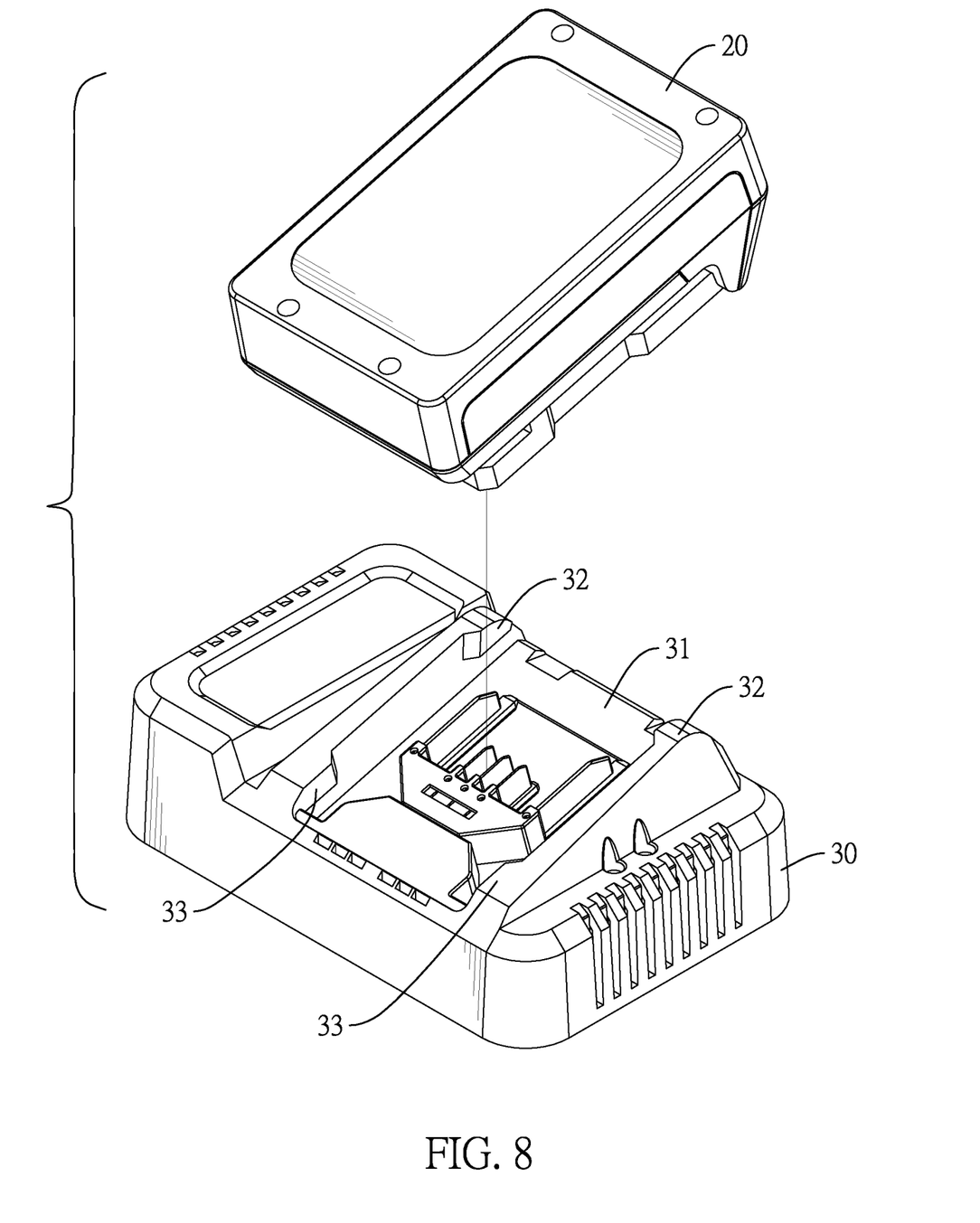
FIG. 8 is an exploded view of the battery-and-charger assembling structure in FIG. 7; showing the battery and the charger.

With further reference to FIGS. 1, 7, and 8, when the battery 20 is out of power, the battery 20 can be detached from the handheld seat 10 and be connected to the charger 30 to recharge.

The charger 30 has a battery groove 31 formed on a top surface of the charger 30. The battery groove 31 has two third assembling segments 32 and two fourth assembling segments 33. The two third assembling segments 32 are formed on two side walls of the battery groove 31 respectively toward each other. The two fourth assembling segments 33 are respectively formed on the two side walls of the battery groove 31 toward each other, are located in the back of the two third assembling segments 32, and are spaced apart from the two third assembling segments 32.

Figure 9:
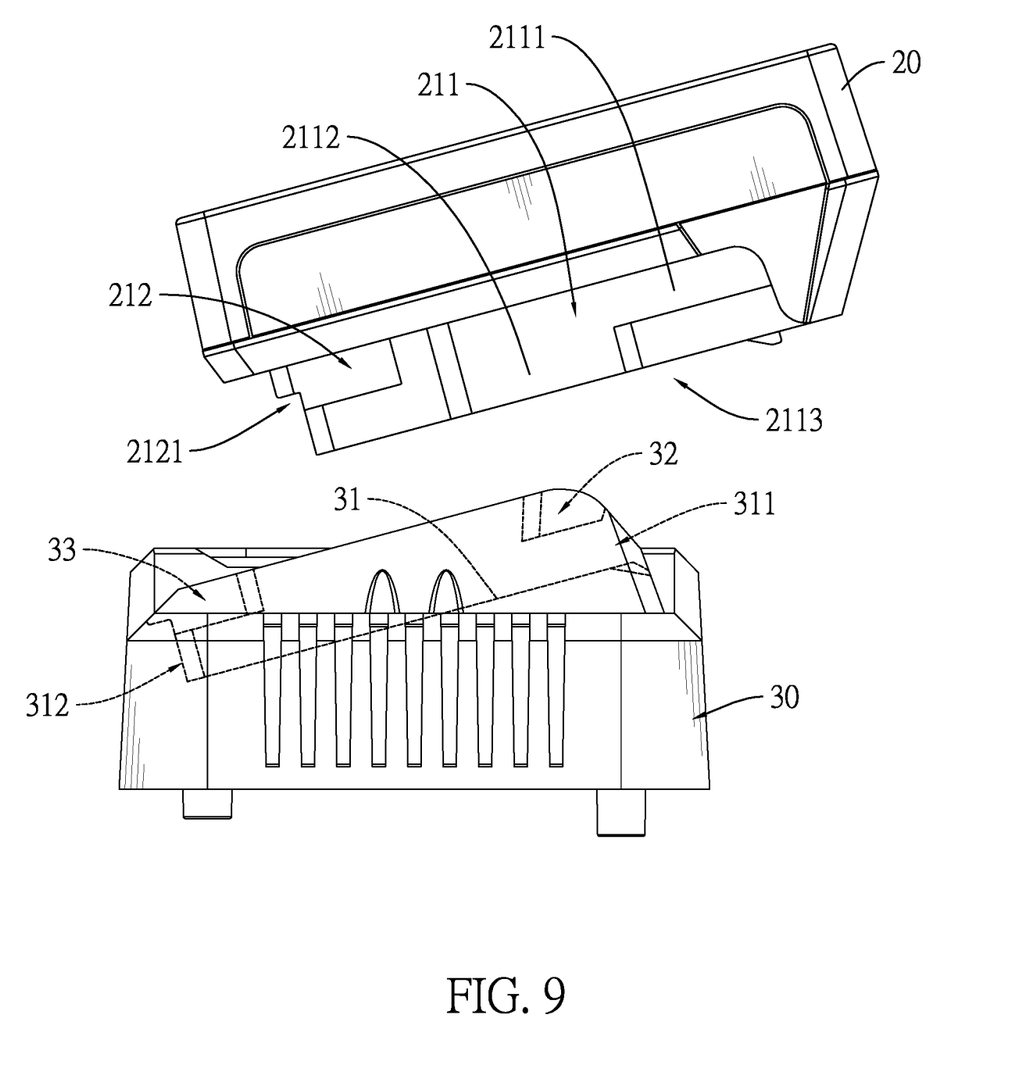
FIGS. 9, 10, and 11 are schematic views of the battery-and-charger assembling structure in FIG. 7; showing the motion during assembling of the battery and the charger.
Figure 10:
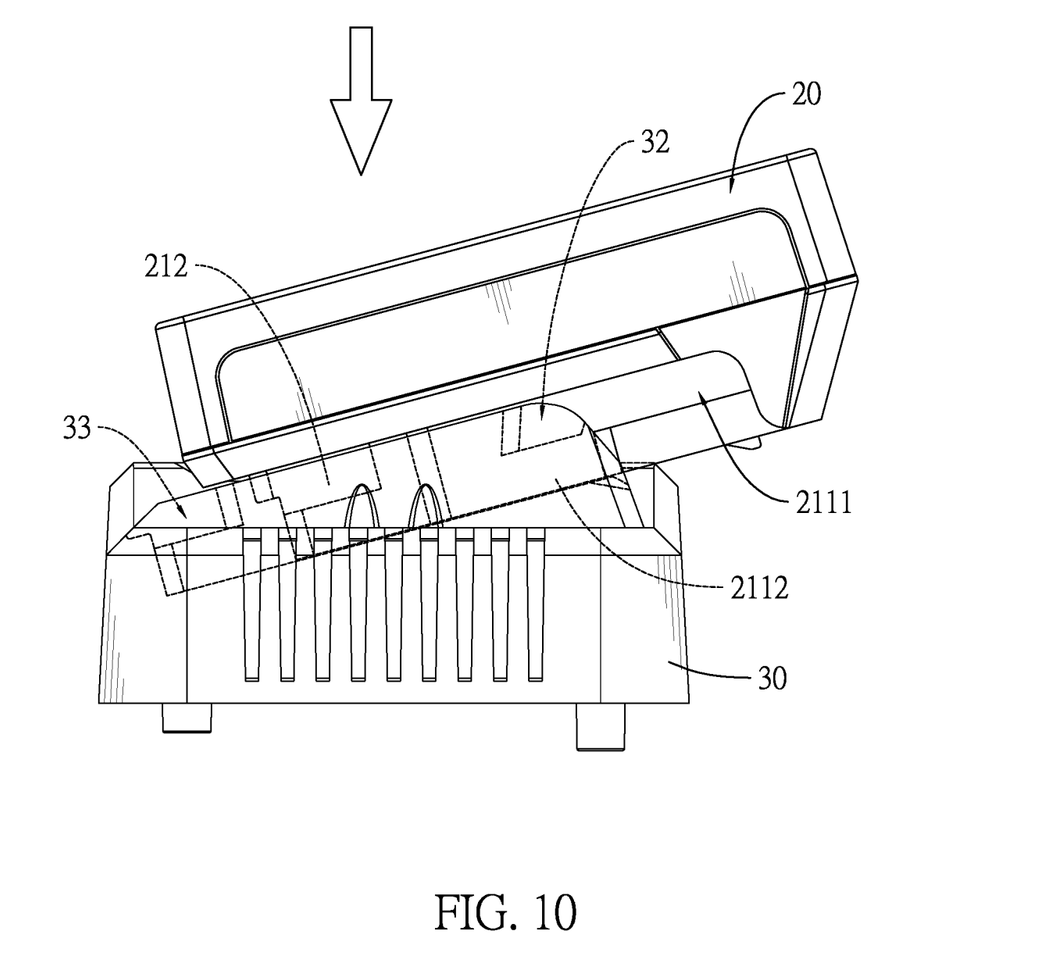
Figure 11:
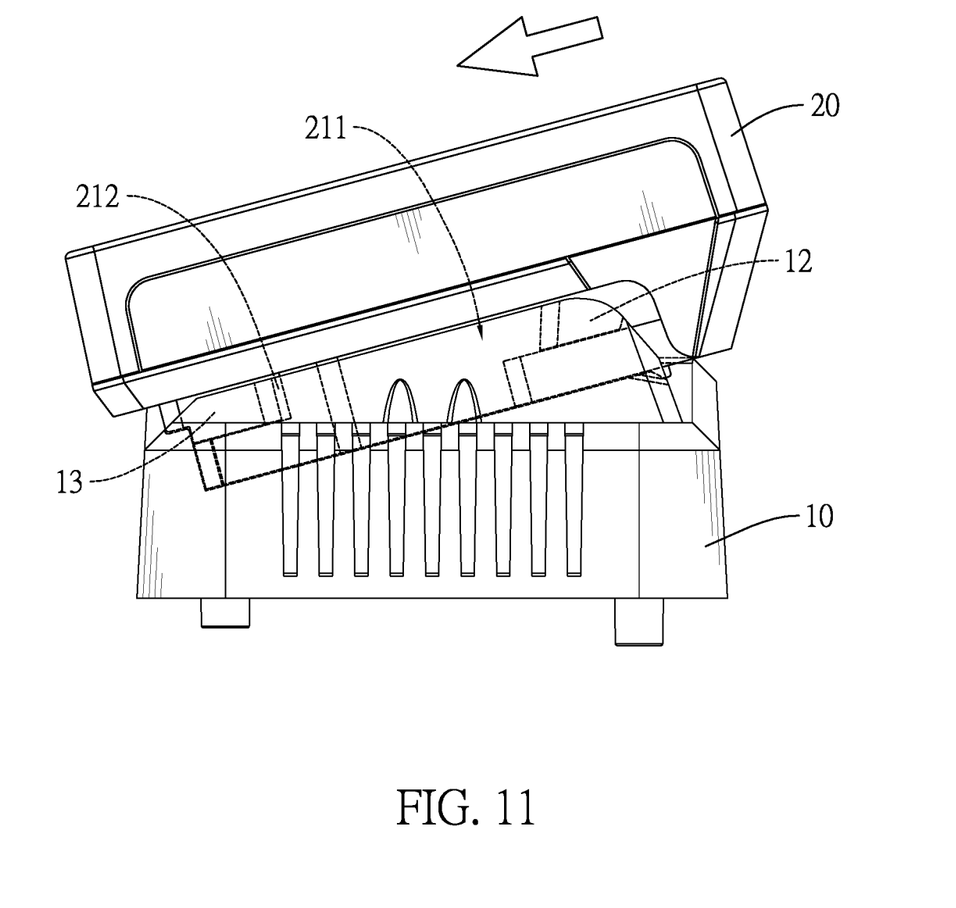

With further reference to FIGS. 9 to 11, the battery 20 is mounted on the handheld seat 10 detachably, and the connecting surface 210 of the battery 20 is mounted in and is connected to the battery groove 31 of the charger 30 when the battery 20 is mounted on the charger 30.

The two third assembling segments 32 of the charger 30 are selectively mounted in the two transverse segments 2111 of the two first grooves 211 of the casing 21 respectively. Each of the third assembling segments 32 enters or departs from the corresponding first groove 211 through the corresponding first opening 2113. The two fourth assembling segments 33 are selectively mounted in the two second grooves 212 of the casing 21 respectively. Each of the fourth assembling segments 33 enters or departs from the corresponding second groove 212 through the corresponding second opening 2121.

In other words, during assembling, the third assembling segment 32 is moved through the first opening 2113 first, and is then moved along the first groove 211, which is in an L shape. When the third assembling segment 32 is moved to the bottom end of the longitudinal segment 2112, the fourth assembling segment 33 of the charger 30 is exactly located in the rear side of the second opening 2121, which is formed on the rear surface of the casing 21 by the second groove 212. At the time when the third assembling segment 32 is moved toward the front end of the transverse segment 2111 along the transverse segment 2111, the fourth assembling segment 33 is moved into the second groove 212 through the second opening 2121. Finally, the third assembling segment 32 is moved to the front end of the transverse segment 2111 as the fourth assembling segment 33 is moved to the front end of the second groove 212, and the assembling process of the charger 30 and the battery 20 is completed.

Briefly, when each of the third assembling segments 32 of the charger 30 engages with the corresponding first groove 2111 through the corresponding first opening 2113, each of the fourth assembling segments 32 is aligned to the second opening 2113 of the corresponding second groove 212. When each of the third assembling segments 32 is moved into the transverse segment 2111 of the first groove 211, each of the fourth assembling segments 33 is moved into the second groove 212.

Besides, in this embodiment, the battery groove 31 of the charger 30 further has a front end 311 and a rear end 312. The front end 311 is to accommodate the front end of the transverse segment 2111 of the battery 20, and the rear end 312 is to accommodate the rear end of the transverse segment 2111 of the battery 20. When the charger 30 is placed horizontally, the rear end 312 inclines downwards relative to the front end 311 so that the battery 20 inclines when the battery 20 is mounted on the horizontally-placed charger 30. In other words, a height above ground level of the rear end 312 of the charger 30 is lower than a height above ground level of the front end 311 of the charger 30. Thus, the battery 20 tends to slide downward toward the rear end 312. By this, the third assembling segment 32 and the fourth assembling segment 33 will be mounted in the front end of the transverse segment 2111 of the first groove 211 and the front end of the second groove 212 respectively by the gravity. Therefore, the battery 20 and the charger 30 are prevented from sliding relative to each other and detaching easily.

The structure of the battery 20 is not limited to the abovementioned, as long as the front end 311 and the rear end 312 can be implemented on a same height above ground level, which means that the battery groove 31 can be implemented horizontally. Thus, the battery 20 is placed horizontally when mounted on the horizontally-placed charger 30. In this case, the first groove 211 of the battery 20 and the third assembling segment 32 of the charger 30 can be fitted tightly in order to prevent relative sliding and detaching, or the first groove 211 and the third assembling segment 32 comprise a bump and a groove engaging with each other.

In addition, the fourth assembling segment 33 and the second groove 212 are made to strengthen the structure of the charger 30 and the battery 20 after assembled. Specifically, the two fourth assembling segment 33 and the two second grooves 212 share the force of the impact with the two third assembling segments 32 and the two first grooves 211 on the two sides of the casing 21 respectively in order to prevent the third assembling segment 32 and the first groove 211 from bearing the force of the impact alone, and therefore strengthen the product. However, the charger 30 and the battery 20 can also be implemented without the fourth assembling segment 33 and the second groove 212.

Moreover, in this embodiment, the transverse segment 2111 of each of the first grooves 211 of the casing 21 is located adjacent to the connecting surface 210 of the casing 21, and the longitudinal segment 2112 of each of the first grooves 211 of the casing 21 is located adjacent to a middle between a front end of the casing 21 and a rear end of the casing 21. By this, the present invention significantly shortens the distance for the third assembling segment 32 to move. Thus, the present invention improves efficiency as well. However, the transverse segment 2111 is not limited to be located adjacent to the connecting surface 210 as well as the longitudinal segment 2112 is not limited to be located adjacent to the middle between the front end of the casing 21 and the rear end of the casing 21.

The structure that the third assembling segment 32 engages with the first groove 211 makes the battery 20 mounted on the charger 30 stably and prevents the battery 20 and the charger 30 from being detached easily, thereby further avoiding recharging failure and fire.

In addition, the transverse segment 2111 and the longitudinal segment 2112 make it unnecessary for the first groove 211 to extend from the front end of the battery 20 to the rear end of the battery 20. Therefore, the first groove 211 shortens the distance that the battery 20 is moved and reduces the time for assembling the battery 20 and the handheld seat 10. Furthermore, the second assembling segment 13 and the second groove 212 strengthen the structure of the handheld seat 10 and the battery 20 after assembled by sharing the force of the impact with the two first assembling segments 12 and the two first grooves 211 on the two sides of the casing 21 respectively, and therefore strengthen the product.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A battery-and-handheld-seat assembling structure for a handheld power tool comprising:
   a handheld seat having
      two assembling walls protruding downwardly from a bottom surface of the handheld seat; the two assembling walls spaced apart from each other; and
      two first assembling segments respectively formed on the two assembling walls toward each other; and
   a battery detachably mounted on the handheld seat and having
      a casing having
         a connecting surface connected to the bottom surface of the handheld seat; and
         two first grooves formed on two side surfaces of the casing respectively; each of the first grooves having a transverse segment extending toward a front end of the casing and a rear end of the casing; a front end of the transverse segment being closed; and a longitudinal segment extending toward a top end of the casing and a bottom end of the casing; the longitudinal segment connected to and communicating with a rear end of the transverse segment, extending to the connecting surface of the casing, and forming a first opening on the connecting surface of the casing; the two first assembling segments of the handheld seat selectively mounted in the two transverse segments of the two first grooves of the casing respectively; each of the first assembling segments entering or departing from the corresponding first groove through the corresponding first opening;

wherein the casing of the battery further has two second grooves respectively formed on the two side surfaces of the casing, located in the back of the two first grooves, and spaced apart from the two first grooves; each of the second grooves extending toward the front end of the casing, extending to a rear surface of the casing, and forming a second opening on the rear surface of the casing; and two stopping walls respectively formed on the two side surfaces of the casing; each of the two stopping walls disposed between a corresponding one of the first grooves and a corresponding one of the second grooves, separating the corresponding first groove and the corresponding second groove, and located in the rear end of the transverse segment the longitudinal segments of the two first grooves respectively extending along the two stopping walls; and the handheld seat further has two second assembling segments respectively formed on the two assembling walls toward each other, located in the back of the two first assembling segments, and spaced apart from the two first assembling segments; the two second assembling segments selectively mounted in the two second grooves of the casing respectively; each of the second assembling segments entering or departing from the corresponding second groove through the second opening of the corresponding second groove;

when each of the first assembling segments of the handheld seat enters the corresponding first groove through the first opening of the corresponding first groove, and each of the second assembling segments is aligned to the second opening of the corresponding second groove; and when each of the first assembling segments is moved into the transverse segment of the first groove, each of the second assembling segments is moved into the second groove.

2. The battery-and-handheld-seat assembling structure as claimed in claim 1, wherein the transverse segment of each of the first grooves of the casing is located adjacent to the connecting surface; and the longitudinal segment of each of the first grooves of the casing is located adjacent to a middle between the front end of the casing and the rear end of the casing.

\* \* \* \* \*